F. S. ELLETT.
CLUTCH.
APPLICATION FILED FEB. 16, 1911.

1,018,890.

Patented Feb. 27, 1912.

2 SHEETS—SHEET 1.

WITNESSES:
M. E. Verbeck.

INVENTOR
Frederick S. Ellett
BY Eugene Diven
ATTORNEY

F. S. ELLETT.
CLUTCH.
APPLICATION FILED FEB. 16, 1911.

1,018,890.

Patented Feb. 27, 1912.
2 SHEETS—SHEET 2.

WITNESSES:
M. E. Verbeck.

INVENTOR
Frederick S. Ellett
BY
Eugene Duen
ATTORNEY

UNITED STATES PATENT OFFICE.

FREDERICK S. ELLETT, OF ELMIRA, NEW YORK.

CLUTCH.

1,018,890.   Specification of Letters Patent.   Patented Feb. 27, 1912.

Application filed February 16, 1911. Serial No. 609,015.

*To all whom it may concern:*

Be it known that I, FREDERICK S. ELLETT, a citizen of the United States, residing at Elmira, in the county of Chemung and State of New York, have invented certain new and useful Improvements in Clutches, of which the following is a specification.

This invention relates more particularly to improvements in clutches for motorcycles, whereby the driving pulley, or wheel, is thrown into or out of engagement with the engine or other driving shaft; my objects being to provide a clutch operating mechanism free from end thrust on the shaft and actuated by means positioned at the inward side of the pulley; that is to say, between the pulley and the engine casing; also to provide a simple and effective spring actuated clutch for this purpose which will take up the load gradually when throwing in the clutch.

I attain my objects by constructing the parts of the clutch and operating mechanism in the manner illustrated in the accompanying drawings, in which—

Figure 1:
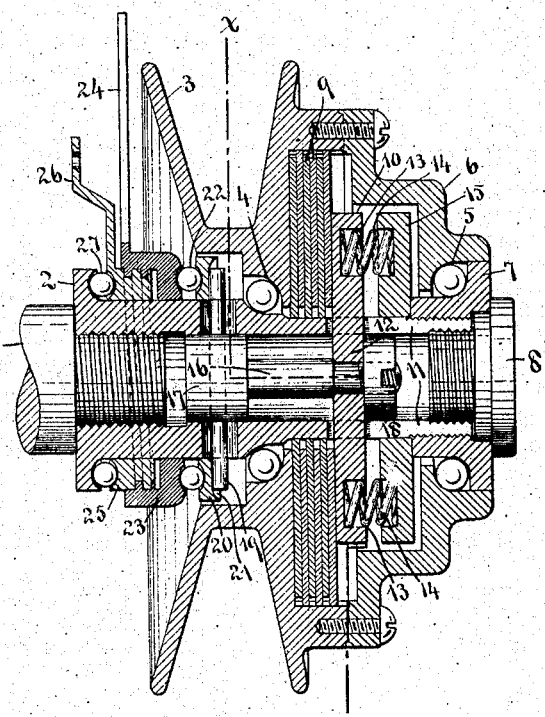
Figure 2:
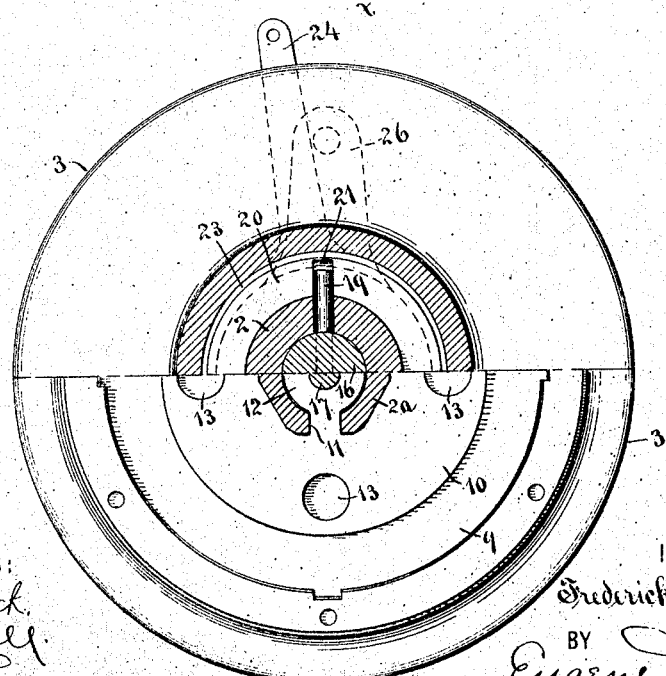

Figure 1 presents a longitudinal sectional view of the clutch as attached to the end of a driving shaft; Fig. 2, a transverse section on the line $x$—$x$ in Fig. 1; and Fig. 3, a longitudinal sectional view of a different form of the clutch.

Like numerals designate like parts in the several views.

To the end of the shaft, 1, a hollow hub or sleeve 2 is fastened in any suitable manner; and it may be integrally fastened thereon. Upon this hub the belt pulley or other driving wheel 3 is mounted on ball bearings, one at 4 and the other at 5. The outward side of the pulley is chambered, and said chamber is inclosed by a cap piece 6, which rides on the bearing 5. The two bearings are adjusted by a cone 7, screwed upon the outward end of the hub and locked in place by the cap screw 8, screwed into the end of the hub.

Within the chamber in the pulley, clutch members, such as a plurality of friction disks 9 are mounted, said disks having alternate locking engagement with the pulley, and hub, in the usual manner, the outward end of the hub being preferably of hexagonal form, as shown at 2ª in Fig. 2, to receive the disks. A setting up disk 10 engages the outward friction disk, and is provided with a central portion 12, positioned in the bore of the hub and united to the outward portion by arms which pass through slots 11, cut into the end of the hub. This setting up disk is provided with a plurality of sockets 13, to receive springs 14, the outer ends of which are positioned in corresponding sockets in a disk 15, fitted upon the end of the hub and braced against the cone 7.

To release the clutch, a push rod 16, having a cylindrical head 17 fitted to the bore of the hub, is fastened by a nut 18 to the central portion 12 of the disk 10. A pin 19 passes through the head 17, and projects through slots in the hub into engagement with the disk 20, which is slidably mounted upon the hub and provided with diametrically opposite grooves 21 to receive the ends of the pin 19. A ball bearing 22 is positioned between the disk 20 and a longitudinally movable thrust member 23, provided with an operating arm 24, from which connection is made to an operating lever upon the handle bar of the motorcycle. This thrust member has a cam engagement with a stationary member 25, which is held against rotation by means of an arm 26, adapted to be fastened to the engine casing, or other fixed support on the machine. The clutch members may also be released by holding cam member 23 stationary and rotating cam member 25. The inward thrust on this cam member is received on the inward end of the hub through a ball bearing at 27. As herein shown the cam member is provided with a spiral, or screw thread groove to receive a corresponding internal thread on the thrust member 23.

To operate the clutch-releasing mechanism the arm 24 will be turned in a direction to move the thrust member 23 outward, thereby imparting outward movement to the thrust bar 16 through disk 20 to pin 19. The disk 10 will thereby be moved outward to compress the springs and release the clutch members. Upon releasing the arm 24 the springs will act to push the disk 10 inward, said inward pressure upon the disk acting through the thrust rod 16 to slowly turn the thrust member 23 backward by reason of the incline given to the cam parts. The clutch members are thus gradually set up into gripping engagement.

Figure 3:
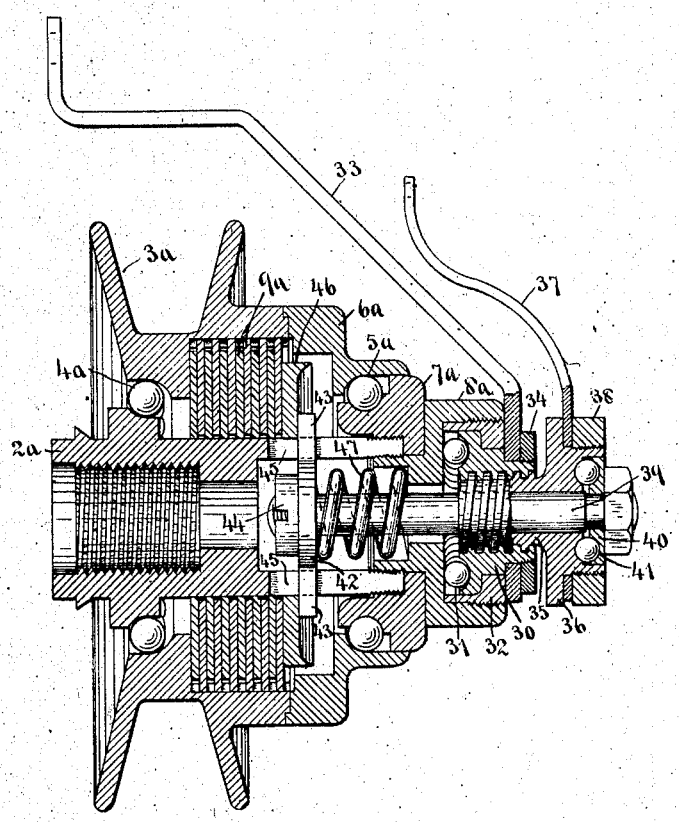

While I prefer to construct the clutch pulley in the manner above described, for the reason that it places the operating arm back of the pulley, that is to say, between the pulley and the engine casing, and provides a more compact construction, I may arrange the spring release mechanism so as to be operated from the outward end of the hub. This form of clutch is shown in Fig. 3, and consists, as before, of a hollow hub 2ª, adapted to be fastened upon the end of the engine shaft, and having the driving pulley 3ª mounted thereon by ball bearings at 4ª and 5ª; a cap 6ª for the clutch chamber being mounted as before upon the bearing 5ª, said bearings being adjusted by a cone 7ª, which is locked in adjustment by means of a cap screw 8ª. This cap screw has an enlarged head provided with a chamber in which a cam member or nut 30 is mounted, said member having a thrust bearing 31 between it and the inward wall of the chamber, and being held in place by a flanged ring 32, screwed into the chamber. The cam member is held against rotation by means of an arm 33, fastened upon its outward end by means of a locknut 34, said arm being fastened to the engine casing or other fixed support, as before. A hollow screw 35, or other suitably formed member to engage the cam surfaces on the member 30, passes outwardly therefrom, and is provided with a head 36 to which an operating arm 37 is fastened by means of a lock nut 38. A rod 39 passes freely through the member 35, and is provided at 40 with a cone ring to receive the balls of the thrust bearing 41, said ring being held on the rod by means of a nut, as shown. Inside the hub is a disk 42, provided with arms 43, which pass out through the slots 45 in the end of the hub, and engage a setting up disk 46, adapted to press inwardly against the friction disks 9ª. A spring 47 is positioned between the disk 42 and the shoulder formed on the inward end of the screw cap 8ª; and a nut 44 secures the disk 42 to the inward end of the rod 39.

The operation of this clutch is similar in all respects to that of the first form described; the only difference being that the spring is drawn outward by the proper movement of the arm 37, instead of being pressed outward, as in the first device.

It will be understood that different arrangements of the thrust springs may be employed in these clutches, and also that the release mechanism may be varied without departing from the spirit of my invention; also that other forms of clutch members may be employed, as I do not intend to restrict myself to the use of friction disks alone. Neither do I restrict the use of this clutch to motorcycles.

What I claim, therefore, as my invention, and desire to secure by Letters Patent, is—

1. The combination with a rotary member, of a concentric wheel mounted for free rotation on said rotary member, a friction disk carried by said wheel on the interior thereof, a plurality of friction disks carried by said rotary member and engaging said first mentioned disk, a plurality of springs for normally holding said disks in gripping engagement, and means independent of the rotations of said wheel and said rotary member for actuating the springs to release the clutch members and comprising a fixed cam member, a revoluble cam member and a thrust bearing.

2. A clutch comprising a rotary member, a wheel rotatably mounted on said member and provided with an interior web having a concentric opening at its center, a bearing between the inner edge of said web and said rotary member, an axially extending concentric flange on said wheel and forming a chamber therein, an annular friction disk within said chamber and carried by said flange, friction disks carried by said rotary member and adapted to engage said annular friction disk, an axially movable member connected with one of said friction disks, a plurality of springs co-acting with said rotary member and said web for normally holding said friction disks in engagement, and means for releasing said disks and including a fixed threaded ring, a revoluble ring having threads engaging the threads on said fixed ring, and a thrust bearing between said revoluble ring and said axially movable member.

3. The combination with a rotary shaft having a hub at one end thereof, of a concentric wheel mounted for free rotation on the hub, clutch members between the wheel and hub, a fixed cam member mounted with a thrust bearing on the inward end of the hub, a revoluble cam member in engagement with said fixed member and adapted to move one of said cam members longitudinally relative to the other, and means whereby the relative longitudinal movement of said cam members will be imparted to the clutch members.

4. The combination with a rotary shaft having a hollow hub at one end thereof, of a concentric wheel mounted for free rotation on the hub, clutch members between the wheel and hub, a fixed cam member mounted with a thrust bearing on the inward end of the hub, a revoluble cam member in engagement with said fixed member and adapted to move one of said cam members longitudinally relative to the other, and means acting through the bore of the hub whereby the relative longitudinal movement of said cam members will be imparted to the clutch members.

5. The combination with a rotary shaft having a hollow hub at one end thereof, of a concentric wheel mounted for free rotation on the hub, clutch members between the wheel and hub, a fixed cam member mounted with a thrust bearing on the inward end of the hub, a revoluble cam member in engagement with said fixed member, a push rod in the bore of the hub, means for imparting longitudinal movement in one direction, to said rod from one of the cam members, a clutch member having a central portion connected to it through longitudinal slots in the hub and attached to the push rod, and one or more springs carried by the hub to impart motion in the opposite direction to said clutch member to place it in gripping engagement with the other clutch member or members.

6. The combination with a rotary shaft having a hollow hub at one end thereof, of a concentric wheel mounted for free rotation on the hub, clutch members between the wheel and hub, a fixed cam member mounted with a thrust bearing on one end of the hub, a revoluble cam member in engagement with said fixed member, a rod in the bore of the hub, means for imparting longitudinal movement in one direction to said rod from one of the cam members, a clutch member having engagement with the rod through longitudinal slots in the hub, and one or more springs carried by the hub to impart motion in the opposite direction to said clutch member to place it in gripping engagement with the other clutch member or members.

7. The combination with a rotary shaft having a hub at one end thereof, of a concentric wheel mounted for free rotation on the hub, said wheel being provided with a chamber on its outward side, a cap piece fastened to the wheel to close said chamber and mounted for free rotation on the outward end of the hub, clutch members in the chamber between the wheel and hub, and means mounted on the hub at the inward side of the wheel and connected through the hub to one of the clutch members for actuating said members.

8. In a clutch, the combination of a rotary member, a wheel rotatably mounted on said rotary member, friction members between said wheel and said rotary member, an axially movable disk carried by said rotary member and engaging one of said friction members, a normally fixed disk carried by said rotary member, a spring co-acting with said disks and adapted to normally hold said friction members in gripping engagement, and means for withdrawing said movable disk from said friction members.

9. In a clutch, the combination of a rotary member, a wheel rotatably mounted on said rotary member, friction members between said wheel and said rotary member, an axially movable disk carried by said rotary member, a normally fixed disk carried by said rotary member, a spring co-acting with said disks and adapted to normally hold said friction members in gripping engagement, an axially arranged member rigidly connected with said movable disk, and cam means connected with said axially arranged member for moving the same.

10. In a clutch, the combination of a rotary member, a wheel rotatably mounted on said rotary member, friction members adapted to connect said wheel and said rotary member, an axially movable disk carried by said rotary member, a normally fixed disk carried by said rotary member, a plurality of springs arranged between said disks and adapted to normally hold said friction members in gripping engagement, an axially arranged member rigidly connected with said movable disk, and cam means connected with said axially arranged member and adapted to move the same to simultaneously compress all of said springs.

11. In a clutch, the combination of a rotary member, a wheel rotatably mounted on said rotary member, a friction disk carried by said rotary member, a plurality of friction disks carried by said wheel, a plurality of concentrically arranged springs carried by said rotary member and adapted to normally hold said friction disks in gripping engagement and means for holding said springs in position.

12. In a clutch, the combination of a rotary member, a wheel rotatably mounted on said rotary member, friction members for connecting said wheel and said rotary member, and means for actuating said friction members and comprising a plurality of disks carried by said rotary member and one of which is normally fixed on said rotary member and the other of which is movable relative thereto, springs arranged in openings in one of said disks and adapted to normally hold said friction members in gripping engagement, and cam means, independent of the rotation of said rotary member, for releasing said friction members.

13. In a clutch, the combination of a sleeve having longitudinally arranged slots extending from one end thereof, a wheel rotatably mounted on said sleeve, friction members between said wheel and sleeve, a spring pressed plate co-acting with said friction members, and having arms arranged in said slots, and means for moving said plate.

14. In a clutch, the combination of a rotary member, a wheel rotatably mounted on said rotary member, friction members between said wheel and said rotary member, a pair of disks carried by said rotary member and each having a plurality of recesses therein, springs arranged in said recesses and adapted to normally hold said friction members in gripping engagement, and means for moving one of said disks so as to simultaneously actuate all of said springs.

15. In a clutch, the combination of a rotary member, a wheel rotatably mounted on said rotary member and having a concentrically arranged chamber in one side thereof, an end plate carried by said rotary member, friction members arranged in said chamber, a plurality of springs co-acting with said end plate to normally hold said friction members in gripping engagement, a longitudinally movable disk engaged by said springs, a bearing plate carried by said rotary member, a relatively stationary member bearing against said bearing plate, a bearing plate connected with said disk and means bearing against the latter of said bearing plates and coacting with said stationary member to move said disk.

In testimony whereof I have affixed my signature, in presence of two witnesses.

FREDERICK S. ELLETT.

Witnesses:
M. E. VERBECK,
EUGENE DIVEN.